Figure 1:
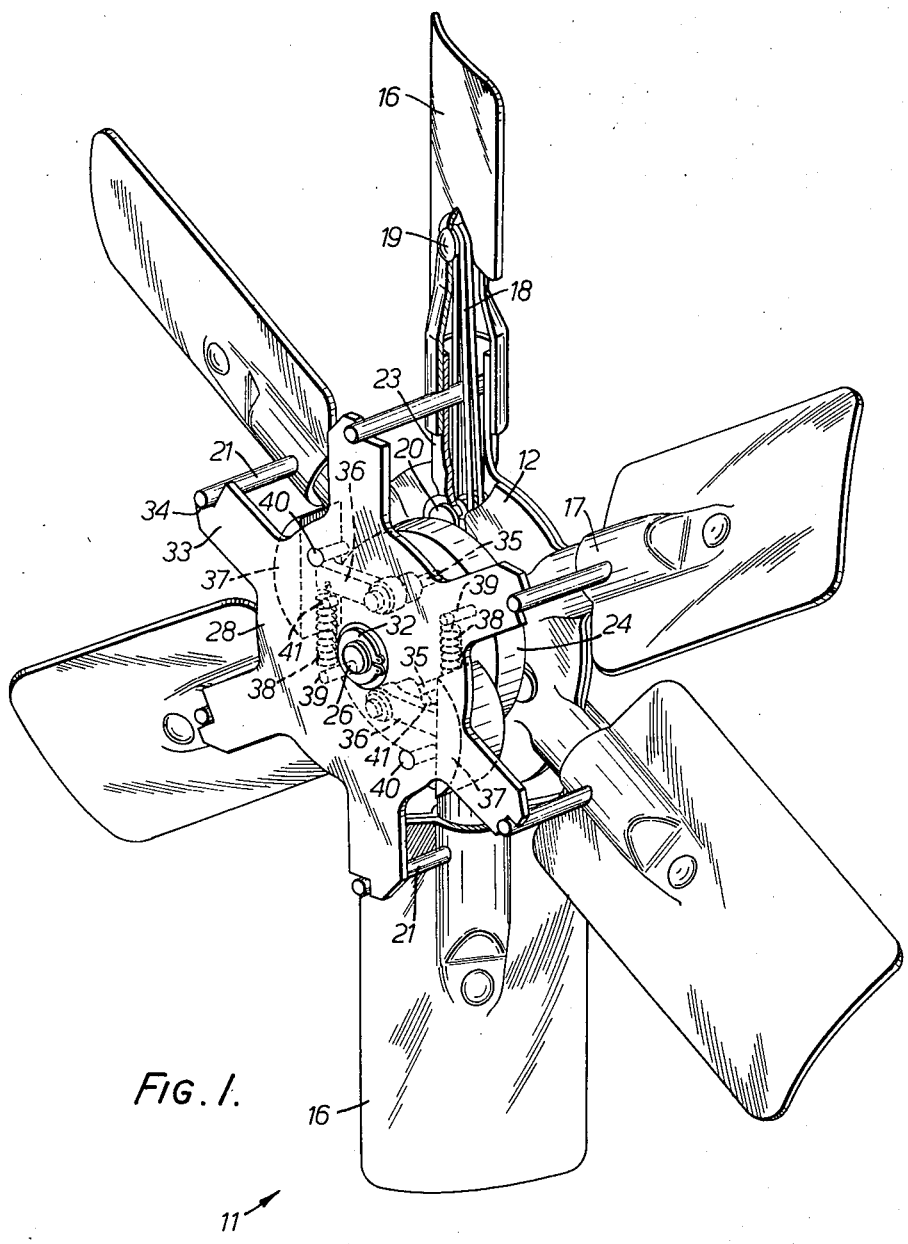

Nov. 16, 1965     A. E. H. ELMER     3,217,808
COOLING FANS

Filed Sept. 28, 1964     2 Sheets-Sheet 1

INVENTOR
ARTHUR E. H. ELMER
BY
Reynolds & Christensen
ATTORNEY

United States Patent Office 3,217,808
Patented Nov. 16, 1965

3,217,808
COOLING FANS
Arthur E. H. Elmer, Painswick, England, assignor to Dowty Hydraulic Units Limited, Cheltenham, England, a British company
Filed Sept. 28, 1964, Ser. No. 399,633
Claims priority, application Great Britain, Oct. 1, 1963, 38,703/63
7 Claims. (Cl. 170—160.16)

This invention relates to cooling fans suitable for use in a vehicle for cooling the engine of the vehicle.

According to the invention, a cooling fan suitable for use in a vehicle and arranged to be driven by the engine of the vehicle, has blades whose pitch is adjustable automatically during operation, in response to changes in the rotational speed of the fan, under spring-reacted centrifugal twisting moments which are inherent in the blades and which bias the blades in the pitch-fining direction, supplementary pitch adjusting means being provided to supplement the effect of the centrifugal twisting moments at relatively high rotational speeds in order then to urge the blades beyond zero pitch just into the negative pitch range to ensure that the volume of air passing through the fan is maintained substantially constant throughout substantially the entire operational rotational speed range of the fan.

At certain relatively high rotational speeds and zero blade pitch the volume of air passed by the fan may be so high that the substantially constant flow characteristics would not be achieved over the entire speed range, but by causing the blades to just enter the negative pitch range, the overall effect, having regard to the twist characteristics of the blades, will be to maintain the substantially constant value without actual reversal of direction of air flow.

The cooling fan may comprise a hub having a plurality of blades mounted thereon and arranged to be variable as to pitch about their longitudinal axes and under their inherent centrifugal twisting moments against the reaction of torsion springs, which serve also to retain the blade upon the hub.

The supplementary pitch adjusting means may comprise a speed-responsive fly-weight mechanism provided upon the hub and operable upon the attainment of a predetermined speed of the fan to impose the supplementary pitch adjustment upon the blades.

The fly-weights of the fly-weight mechanism may themselves be pivotally mounted upon the hub so as to be capable of moving radially-outwardly away from the axis of rotation of the fan, such movement being restrained by a spring device for each fly-weight.

The fly-weight mechanism may be so mounted as to engage an auxiliary member mounted for relative angular movement with respect to the hub and in operable engagement with the roots of the blades.

The auxiliary member may be of spider-like form and engageable with a plurality of blade pins, one for each blade, projecting from its respective blade root. In this way relative angular movement of the auxiliary member with respect to the hub of the fan directly mechanically effects supplementary blade pitch adjustment upon all the blades in unison.

Figure 2:
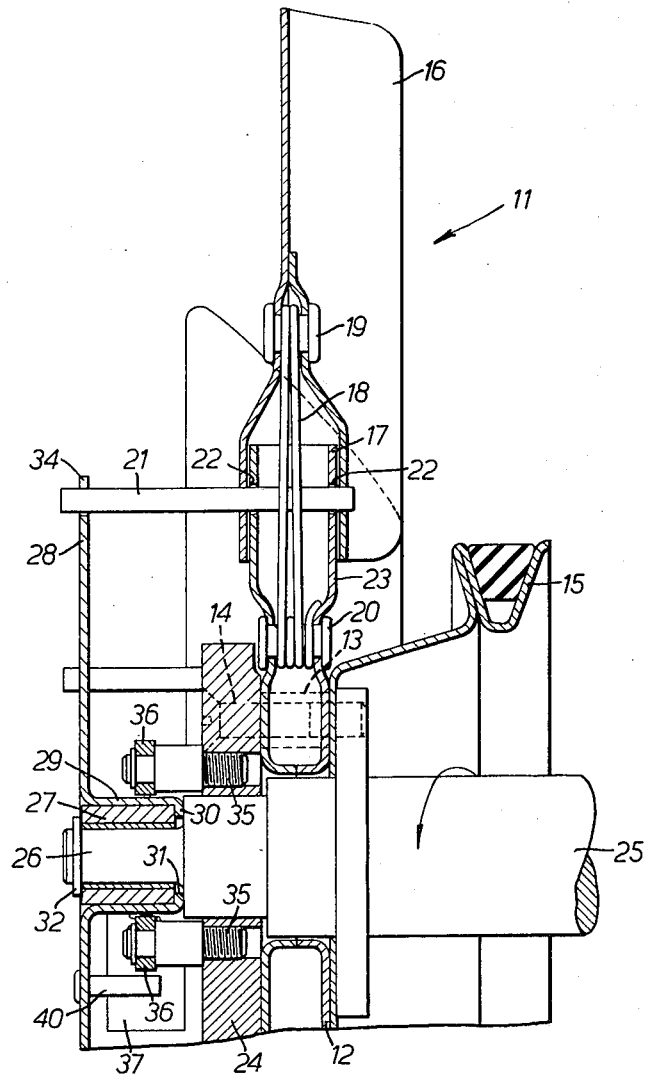

One embodiment of the invention will now be particularly described by way of example with reference to the accompanying drawings, of which, FIGURE 1 is a perspective view of a six-bladed cooling fan suitable for use in a vehicle, and FIGURE 2 is a cross-section of a part of the cooling fan shown in FIGURE 1.

Referring to the drawings, a six-bladed cooling fan 11, suitable for use in a road vehicle for cooling the engine of the vehicle, comprises a hub 12 which may be bolted in known manner by means of bolt holes 13 and set bolts 14 to a pulley 15, mounted so that it may be driven by a belt from the engine crank-shaft.

Each of the six blades 16 is pivotally mounted at 17 upon the hub for pitch change movement about its longitudinal pitch change axis. Each blade is retained with respect to the hub in the radial sense by a double-looped torsion spring 18 held fast with the blade by means of a rivet 19 and held fast with the hub by means of a rivet 20. Each blade root is provided with a pin 21 projecting forwardly of the blade and parallel with the rotational axis of the fan. This pin is fixed rigidly to the blade root but, by virtue of a pair of circumferentially-directed elongated slots 22 formed in the respective stub portion 23 of the hub upon which the blade is mounted, movement of the blade throughout the desired pitch change range is afforded. Thus, either end portion of the elongated slots 22 act as an end stop, one in the coarse, and the other in the fine pitch directions.

The set bolts 14 as well as retaining the fan upon the pulley 15, also retains a ring member 24 upon the forward face of the hub 12. A drive shaft 25 for the water pump (not shown) associated with the fan, passes through the hub 12 and forwardly through the ring member 24, being reduced in diameter at 26.

Mounted in a bush 27 carried by the portion 26 of the shaft 25 is an auxiliary member 28 of spider-like shape. This member has a cylindrical portion 29 with an inturned lip 30 by which it is located in the axial sense between the bush 27 and a step 31 formed on the shaft 25. The bush is retained upon the portion 26 of the shaft 25 by means of a circlip 32.

The auxiliary member 28 is provided with radially-outwardly directed projections 33, each such projection having an upstanding portion 34 at its outer end which is engageable with the respective blade pin 21.

The member 24 carries two pivot pins 35 extending forwardly of the member towards the auxiliary member 28. These pins are diametrically opposed upon the member 24 and each carry a pivotal lever member 36 the end portion of which remote from the pivot pin is formed integrally with a fly-weight 37. Each lever arm and fly-weight lies in a plane which is transverse to the rotational axis of the fan, each fly-weight and arm being displaceable in a direction away from the rotational axis of the fan against the effort of a tension coil spring 38. Each spring 38 is anchored to a pin 39 carried by the member 24. Two diametrically-opposed driving pins 40 are provided on the rearwardly-facing surface of the auxiliary member 28. These pins are positioned so as to be engageable by the lever arm 36 of the respective fly-weight 37.

By the construction above described, the auxiliary member 28 is relatively angularly displaceable with respect to the hub 12 of the fan and about the rotational axis, this occurring when the speed of the fan reaches a predetermined value at which the fly-weights 37 move outwardly away from rotational axis of the fan and the lever arms thereof engage the driving pins 40.

Associated with each of the lever arms 36 is a stop 41 upon which the fly-weights respectively rest when the speed of rotation of the fan is below the said predetermined value.

In operation of the fan, as its rotational speed increases, the inherent centrifugal twisting moments of the blades 16 tend to turn the blades towards fine pitch, such movement being reacted by the looped-torsion springs 18. In this way automatic pitch change adjustment is provided with increase in speed so as progressively to reduce pitch in order that the volume of air passing through the fan is maintianed substantially constant throughout substantially the whole operational rotational speed range of the fan. However, at certain relatively high rotational speeds and zero blade pitch, this pitch corresponding to zero centrifugal twisting moments, the volume of air passed through the fan can be otherwise so high that the substantially constant flow characteristics would not be achieved over the entire speed range. The fly-weight mechanism is thus provided to ensure that at such relatively high speeds the pitch of the blades is adjusted beyond the zero pitch position just into the negative pitch range.

The manner of engagement of the upstanding portions 34 of the projections 33 of the auxiliary discs 28, with the blade root pins 21, permits automatic movement of the blades to zero pitch under the centrifugal twisting moments inherent in the blades when the fan reaches its higher speed range, these moments being reacted by the looped springs 18. However, upon the attainment of even relatively higher speeds, the fly-weights 37 and their lever arms 36 move radially outwardly away from the axis of rotation of the fan and about the pivot pins 35, thereby to cause the effort of the torsion springs 38 to be overcome and the lever arms to engage the driving stops 40. Hence, relative rotation of the auxiliary member 28 with respect to the fan hub 12 occurs. This relative rotation is transmitted through the blade pins 21 to the roots of the blade 16 so that a further pitch adjustment is superimposed upon that arising from the inherent centrifugal twisting moments. In consequence, the blades move just into the negative pitch range so that the overall effect, having regard to the twist characteristics of the blades, will be to maintain the substantially constant volume of air without actual reversal of the direction of air flow.

I claim as my invention:

1. A fan for cooling the engine of an automotive vehicle, at substantially constant volume air flow regardless of the speed of the vehicle or the corresponding rotational speed of the fan, said fan being arranged to be driven by the engine, and comprising, in combination:
    (a) a hub rotative at a speed corresponding to the engine's speed,
    (b) a plurality of blades distributed about the hub and each mounted thereon for pivotal movement about a radially directed pitch-change axis,
    (c) spring means reacting between the hub and the blades to bias each blade towards a coarse-pitch position, and yieldably resisting their twisting about their axis towards a fine-pitch position under the influence of inherent centrifugal twisting moments that increase with increase in rotational speed of the hub, and
    (d) supplementary pitch-adjusting means operable at relatively high speeds of the vehicle and consequent relatively high rotational speeds of the fan, to supplement the effect of the inherent centrifugal twisting moments, and thereby to maintain the volume of air passing through the fan substantially constant throughout the fan's rotational speed range.

2. A cooling fan as in claim 1, including an anchorage on the hub and on each blade, and wherein the spring means comprise a torsion spring for each blade extending between and secured to each of the two anchorages, and retaining its blade upon the hub.

3. A cooling fan as in claim 2, wherein the supplementary pitch-adjusting means comprises a speed-responsive fly-weight mechanism mounted upon the hub, and operatively connected to each blade to effect supplementary pitch adjustment of the latter upon attainment of a predetermined rotational speed of the fan and a corresponding forward speed of the vehicle.

4. A cooling fan as in claim 3, wherein a fly-weight mechanism is provided for the blades, and each fly-weight is pivotally mounted upon the hub so as to be capable of moving radially outwardly away from the axis of rotation of the fan, and each fly-weight mechanism including spring means to restrain such movement of each fly-weight.

5. A cooling fan as in claim 4, including an auxiliary member rotative with the hub and arranged for angular movement with respect thereto, said auxiliary member being so movable under the influence of the fly-weight mechanism, and being operatively engaged with the roots of the blades, to govern their rotation about their pitch-change axes upon attainment of a predetermined rotational speed of the fan.

6. A cooling fan as in claim 5, including a pin projecting from each blade root, radially of its pitch-change axis, and wherein the auxiliary member is in the form of a spider rotative about the fan's axis of rotation and engageable with each of said pins.

7. A cooling fan as in claim 6, wherein the hub includes radially directed stub portions, one for each blade, and each blade root is rotatively fitted upon its stub portion for pitch change, each stub portion being formed with a circumferentially directed slot, and the pins are secured rigidly to the respective blade roots and project through said slots, the extent of said slots being such as to define the range of pitch adjustment, with the minimum blade angle adjustment just within the negative pitch range.

No references cited.

MARK NEWMAN, *Primary Examiner.*

JULIUS E. WEST *Examiner.*